United States Patent Office 3,400,151
Patented Sept. 3, 1968

3,400,151
BICYCLIC DIMER OF ETHANE-1-HYDROXY-1,1-DIPHOSPHONIC ACID AND SALTS THEREOF
Oscar T. Quimby, Colerain Township, Hamilton, Ohio, and James B. Prentice, Batesville, Ind., assignors to The Procter & Gamble Company, Cincinnati, Ohio, a corporation of Ohio
No Drawing. Filed Dec. 28, 1967, Ser. No. 694,112
2 Claims. (Cl. 260—502.4)

ABSTRACT OF THE DISCLOSURE

Compounds having a formula:

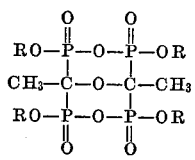

in which R is hydrogen, sodium, potassium, lithium, or ammonium. The compounds are of the class of bicyclic dimers of ethane-1-hydroxy-1,1-diphosphonic acid, useful as sequestering agents and detergency builders.

BACKGROUND OF THE INVENTION

Field of the invention.—The compounds of the present invention are condensates of ethane-1-hydroxy-1,1-diphosphonic acid joined by an ether and two anhydride bonds.

Description of the prior art.—Ethane-1-hydroxy-1,1-diphosphonic acid has the following formula:

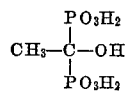

This compound is described as a valuable detergency builder in U.S. Patent 3,159,581.

Ethane-1-hydroxy-1,1-diphosphonic acid is a known compound, a method for its preparation having been published in 1897 by Hans von Baeyer and K. A. Hofmann (Berichte 30, 1973–1978). The method described therein is essentially a reaction between glacial acetic acid and phosphorus trichloride. This reaction proceeds through the formation of acetyl chloride and phosphorous acid as intermediates.

A similar reaction system is described in an article authored by Benjamin T. Brooks, titled, "The Action of Phosphorus Trichloride on Organic Acids; Monoacetyl Phosphorous Acid," published in the Journal of the American Chemical Society, vol. 34, 492–499 (1912).

A process for preparing ethane-1-hydroxy-1,1-diphosphonate is described and claimed in copending patent application Ser. No. 444,046, filed Mar. 30, 1965, now U.S. Patent 3,366,676, which comprises reacting phosphorus trichloride and acetic acid in the presence of a lower aliphatic amine solvent (e.g., tributylamine).

Another process for preparing ethane-1-hydroxy-1,1-diphosphonic acid is described in copending patent application Ser. No. 455,567, filed May 13, 1965, now U.S. Patent 3,366,377, by Oscar T. Quimby, which describes a reaction between phosphorous acid, acetic anhydride, and acetyl chloride.

Ethane-1-hydroxy-1,1-diphosphonic acid can also be prepared by the reaction between acetic acid and an anhydride.

SUMMARY OF THE INVENTION AND DESCRIPTION OF PREFERRED EMBODIMENTS

It has now been discovered that a compound having the following formula

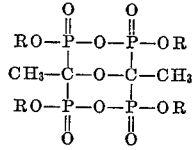

is prepared by basic hydrolysis of a diacetylated cyclic dimer of ethane-1-hydroxy-1,1-diphosphonic acid compounds having a formula

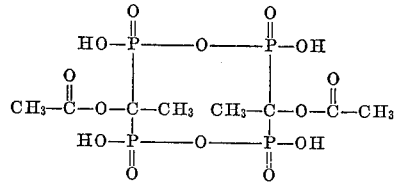

A diacetylated cyclic dimer of ethane-1-hydroxy-1,1-diphosphonic acid can be prepared according to the process described in a copending commonly assigned patent application being filed concurrently herewith. The process described in the copending application comprises the steps of dissolving ethane-1-hydroxy-1,1-diphosphonic acid in acetic acid, and then adding a volume of acetic anhydride equal to the volume of acetic acid used. The diacetylated cyclic dimer of ethane-1-hydroxy-1,1-diphosphonic acid forms and precipitates quickly, e.g., within a few seconds forming a slurry. The slurry is then cooled to room temperature and digested for about an hour. The solids are recovered by filtration, washed with ethyl ether and dried under dry nitrogen.

The basic hydrolysis step of the diacetylated cyclic dimer of ethane-1-hydroxy-1,1-diphosphonic acid in an aqueous solution can use stoichiometric amount of base, but preferably a slight excess of base is used. The initial aqueous solution is prepared by dissolving a sodium salt of diacetylated cyclic dimer of ethane-1-hydroxy-1,1-diphosphonic acid in water or by dissolving the diacetylated cyclic dimer of ethane-1-hydroxy-1,1-diphosphonic acid in aqueous sodium bicarbonate.

From the known instability of P—O—P bonds, the diacetylated dimer of ethane-1-hydroxy-1,1-diphosphonic acid would be expected to open one of its P—O—P bonds during the hydrolysis reaction resulting in the formation of a cyclic condensate of ethane-1-hydroxy-1,1-diphosphonic acid having a formula

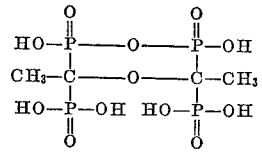

However, hydrolysis data in both acid and base clearly deny that this happens. The reason for this and the actual hydrolysis sequence can be understood and become apparent when the stereoisomers of the compounds of the present invention are investigated.

The isomers of the compounds of the present invention are oriented in such a way that it is impossible to construct a model with either CH₃ group outside of the C—O—C plane as is required for a model of the foregoing cyclic condensate of ethane-1-hydroxy-1,1-diphosphonic acid. Thus, as a matter of fact, the compounds of the present invention, contrary to expectation, cannot be hydrolyzed to the cyclic condensate of ethane-1- hydroxy-1,1-diphosphonic acid shown immediately above.

The bicyclic structure of the compounds of the present invention is so closely packed that attempting to open a P—O—P bond to insert a mole of water (H+ and OH−) simultaneously ruptures another bond in the molecule. The C—O—C bond on the compounds of the present invention is the hydrolyzable bond which can be opened without disrupting the remainder of the molecule.

The reaction route to formation of the bicyclic dimers of ethane-1-hydroxy-1,1-diphosphonic acid of the present invention is illustrated by the following equation:

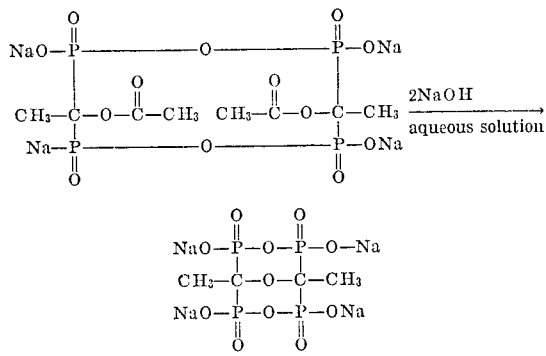

The sodium salt of the bicyclic dimer of ethane-1-hydroxy-1,1-diphosphonic acid is then precipitated from solution as a crystalline solid by addition of a non-solvent such as methanol and/or acetone.

Example.—Tetrasodium salt of bicyclic dimer of ethane-1-hydroxy-1,1-diphosphonic acid .75 gm. of tetrasodium diacetylated cyclic dimer of ethane-1-hydroxy-1,1-diphosphonic acid (.0013 mole) was dissolved in 22 cc. water containing 2 moles sodium hydroxide per mole of tetrasodium diacetylated cyclic dimer of ethane-1-hydroxy-1,1-diphosphonic acid. The solution was then diluted with 55 cc. of methanol and 20 cc. of acetone. A precipitate began to crystallize which was then recovered by filtering, washing with methanol, and dried in the laboratory. The yield of dried crystals was .5 gm. of tetrasodium bicyclic dimer of ethane-1-hydroxy-1,1-diphosphonic acid (.001 mole) corresponding to about a 75% yield.

*Analysis.*—Theory: C/P, 1.00; C, 10.8; P, 27.8; H, 1.4; Na, 20.6; molecular weight, 446. Found: C/P, 1.07; C, 10.7; P, 25.8; H, 2.3; Na, 19.8; molecular weight, 477.

The NMR spectra of this compound exhibits a multiplet (greater than peaks) at delta=−12 p.p.m. by $^{31}$P-MR, and by H$^1$MR a multiplet at tau=7.40 p.p.m. Both the $^{31}$P and H$^1$MR spectra exhibit sharp ringlets when the other is magnetically decoupled. The additional multiplicity for this compound could be due to hindered rotation. Hindered rotation in the bicyclic ring structure gives rise to three possible stero-isomers.

In the example given above, the tetrasodium diacetylated cyclic dimer of ethane-1-hydroxy-1,1-diphosphonic acid can be replaced with equivalent amounts of corresponding tetrapotassium, tetralithium, tetraamonium salts, with the result that corresponding salts of bicyclic dimer of ethane-1-hydroxy-1,1-diphosphonic acid is prepared in the same manner. The sodium hydroxide can also be replaced with either potassium hydroxide, lithium hydroxide or ammonium hydroxide with satisfactory results.

The alkali metal salts, especially sodium and potassium salts of the bicyclic dimer of ethane-1-hydroxy-1,1-diphosphonic acid, are especially useful as sequestering agents and also as builders in detergent compositions. As a builder compound, the sodium and potassium salts are in a class with citrate compounds for this purpose. As builders, the compounds of the present invention can be used in admixture with detergent compounds selected from the group consisting of anionic, nonionic, ampholytic, cationic, and zwitterionic synthetic detergents.

Generally, the builders are used in the detergents in weight proportions of detergent to builder of about 3:1 to about 1:10. In complete detergent formulations containing the aforementioned detergent-builder mixtures there can also be used the usual types of additives such as alkaline materials, silicates, sulphates, germicides, suds builders or suppressers, dyes, enzymes, perfumes, antiredeposition agents, e.g., carboxymethylcellulose, and the like.

The builder compounds can be formed using the acid and neutralizing the solution to a pH of 8–12 with a base, e.g., sodium hydroxide.

The members of the new class of bicyclic dimers of ethane-1-hydroxy-1,1-diphosphonic acid are also useful as sequestering agents and in this respect, too, are in a class with the citrate compounds. In this useful application these compounds can be used to complex sequester metal ions such as calcium, magnesium, iron, etc. Examples of such applications include softening of water and prevention and removal of scale deposits in boilers, oil wells and metal tubing used in connection therewith. Other useful applications are described in a text entitled "Organic sequestering Agents," by Charbarek and Martell, published in 1959 by John Wiley and Sons.

Any of the preceding compounds can be converted directly to the free acid by passing them through a hydrogen cation exchanger such as Dowex 50W–X8.

What is claimed is:
1. Compounds having a formula

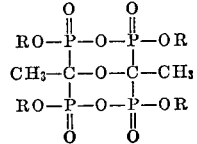

in which R is hydrogen, sodium, potassium, lithium or ammonium.

2. Bicyclic dimer of ethane-1-hydroxy-1,1-diphosphonic acid having a formula

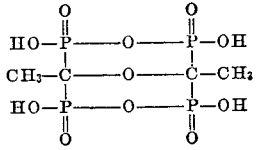

References Cited

UNITED STATES PATENTS 3,202,579   8/1965   Berth et al. _____ 260—502.4

LEON ZITVER, *Primary Examiner.*

J. E. EVANS, *Assistant Examiner.*